US012638422B2

(12) United States Patent
Suzuki et al.

(10) Patent No.: US 12,638,422 B2
(45) Date of Patent: May 26, 2026

(54) CALIBRATION METHOD FOR ACOUSTIC SENSOR

(71) Applicant: EBARA CORPORATION, Tokyo (JP)

(72) Inventors: Yuta Suzuki, Tokyo (JP); Taro Takahashi, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 477 days.

(21) Appl. No.: 18/080,510

(22) Filed: Dec. 13, 2022

(65) Prior Publication Data

US 2023/0194477 A1    Jun. 22, 2023

(30) Foreign Application Priority Data

Dec. 22, 2021    (JP) ................................. 2021-207690

(51) Int. Cl.
| | |
|---|---|
| *G01N 29/12* | (2006.01) |
| *B24B 37/34* | (2012.01) |
| *B24B 49/00* | (2012.01) |
| *G01H 1/06* | (2006.01) |
| *G01N 29/30* | (2006.01) |

(52) U.S. Cl.
CPC ............. *G01N 29/12* (2013.01); *B24B 37/34* (2013.01); *B24B 49/003* (2013.01); *G01H 1/06* (2013.01); *G01N 29/30* (2013.01)

(58) Field of Classification Search
CPC ..... B24B 49/003; B24B 49/10; B24B 49/045; B24B 37/013; B24B 37/005; B24B 37/042; B24B 37/10; B24B 1/04; B24B 7/228
USPC ........................................ 451/5, 8, 285, 286
See application file for complete search history.

(56) References Cited

U.S. PATENT DOCUMENTS

| | | | | |
|---|---|---|---|---|
| 5,222,329 A | | 6/1993 | Yu | |
| 6,352,466 B1 * | | 3/2002 | Moore | .................... B24B 49/00 |
| | | | | 451/6 |
| 10,478,937 B2 * | | 11/2019 | Tang | ..................... B24B 37/013 |
| 10,553,507 B2 * | | 2/2020 | Ono | ........................ H01L 22/26 |

(Continued)

FOREIGN PATENT DOCUMENTS

| | | | | | |
|---|---|---|---|---|---|
| CN | | 111168569 A | * | 5/2020 | ........... B24B 49/006 |
| JP | | S62-120950 A | | 6/1987 | |
| JP | | 2017-163100 A | | 9/2017 | |

(Continued)

OTHER PUBLICATIONS

Machine translation of CN-111168569-A (Year: 2020).*
Singapore Patent Application No. 10202260399R; Search Report; dated Feb. 6, 2026; 2 pages.

*Primary Examiner* — Robert F Neibaur
(74) *Attorney, Agent, or Firm* — BakerHostetler

(57) ABSTRACT

A method in which an acoustic sensor disposed in a polishing apparatus can be accurately calibrated is disclosed. In this method, polishing sounds of a substrate are acquired using an acoustic sensor; and then at least two distinctive sounds, having distinctive frequencies respectively, are selected from the acquired polishing sounds. Further, the at least two distinctive sounds are output from a sound source coupled to any of a polishing table, the acoustic sensor, and a substrate holder to cause the at least two distinctive sounds to be input to the acoustic sensor. Next, output values of the acoustic sensor are calibrated, such that the output values of the acoustic sensor relative to the at least two distinctive sounds come within an allowable range.

10 Claims, 6 Drawing Sheets

(56)  References Cited

U.S. PATENT DOCUMENTS 12,320,883 B2 *   6/2025   Xu ........................... C09G 1/02

FOREIGN PATENT DOCUMENTS

| | | | |
|---|---|---|---|
| KR | 2018-0055113 | A | 5/2018 |
| TW | 201126587 | A | 8/2011 |
| TW | 201505188 | A | 2/2015 |
| WO | WO 2010/067732 | A1 | 6/2010 |
| WO | WO 2016/140769 | A1 | 9/2016 |

* cited by examiner

CALIBRATION METHOD FOR ACOUSTIC SENSOR

CROSS REFERENCE TO RELATED APPLICATION

This application claims priority to Japanese Patent Application No. 2021-207690 filed Dec. 22, 2021, the entire contents of which are hereby incorporated by reference.

BACKGROUND

A CMP (Chemical Mechanical Polishing) apparatus is a polishing apparatus used to polish a surface of a substrate, such as a wafer, in the manufacture of semiconductor devices. The CMP apparatus is configured to hold and rotate the substrate with a polishing head, and press the substrate against a polishing pad on a rotating polishing table to polish the surface of the substrate. During polishing, a polishing liquid (or slurry) is supplied onto the polishing pad, so that the surface of the substrate is planarized by the chemical action of the polishing liquid and the mechanical action of abrasive grains contained in the polishing liquid.

In such polishing apparatus, an acoustic sensor (for example, ultrasonic sensor, and AE sensor) may be used to detect a polishing state of the substrate. Examples of the polishing state of the substrate detected by acoustic sensor include an end point of polishing of the substrate, and an abnormality in polishing of the substrate. The acoustic sensor is disposed in a polishing chamber, for example, in which a polishing table is placed, and collects polishing sounds generated during polishing of the substrate. The polishing apparatus determines the polishing state of the substrate (for example, the end point of polishing of the substrate) based on the collected polishing sounds.

After a certain period of time has elapsed since the acoustic sensor has been in use, the measurement values of the acoustic sensor (i.e., output values of the acoustic sensor) may become shifted. Further, depending on installation conditions (for example, installation positions) of acoustic sensors in each polishing apparatus, the output values of each of the acoustic sensors may be different from each other. Therefore, it is necessary to calibrate the acoustic sensor periodically.

SUMMARY

Therefore, there is provided a method capable for accurately calibrating an acoustic sensor disposed in a polishing apparatus.

Embodiments, which will be described below, relate to a calibration method for an acoustic sensor, and particularly relates to a calibration method for an acoustic sensor which is disposed in a polishing apparatus.

In an embodiment, there is provided a calibration method for an acoustic sensor provided in a polishing apparatus in which a substrate held in a substrate holder is pressed against a polishing pad attached to a polishing table to thereby polish the substrate, comprising: acquiring polishing sounds of the substrate using the acoustic sensor; selecting at least two distinctive sounds, having distinctive frequencies respectively, from the acquired polishing sounds; outputting the at least two distinctive sounds from a sound source coupled to any of the polishing table, the acoustic sensor, and the substrate holder to input the at least two distinctive sounds to the acoustic sensor; and calibrating output values of the acoustic sensor, such that the output values of the acoustic sensor relative to the at least two distinctive sounds come within an allowable range.

In an embodiment, the acoustic sensor is an AE sensor mounted to the polishing table, and the sound source is placed at a position corresponding to a polishing position of the substrate in the polishing pad or the polishing table.

In an embodiment, the sound source is an AE sensor for sound source, which has the same configuration as the AE sensor.

In an embodiment, the sound source is arranged directly above the AE sensor.

In an embodiment, the acoustic sensor is an ultrasonic sensor coupled to an arm supporting the substrate holder, and the sound source is placed at a position corresponding to a polishing position of the substrate in the polishing pad or the polishing table.

In an embodiment, the acoustic sensor is an ultrasonic sensor coupled to an arm supporting the substrate holder, and the sound source is coupled to the acoustic sensor.

In an embodiment, the acoustic sensor is mounted to the substrate holder, and the sound source is mounted to the substrate holder.

In an embodiment, the acoustic sensor is an AE sensor.

In an embodiment, the sound source is an AE sensor for sound source, which has the same configuration as the AE sensor.

In an embodiment, inputting the at least two distinctive sounds to the acoustic sensor is performed while the substrate is being held by the substrate holder.

In one embodiment, an alarm is issued when any of output values of the acoustic sensor relative to the at least two distinctive sounds exceed an upper threshold or a lower threshold.

According to the above-described embodiments, the acoustic sensor is calibrated based on the polishing sound generated during the polishing of the substrate. As a result, the acoustic sensor can be accurately calibrated based on the actual polishing sounds.

DESCRIPTION OF EMBODIMENTS

Hereinafter, embodiments will be described with reference to the drawings.

Figure 1:
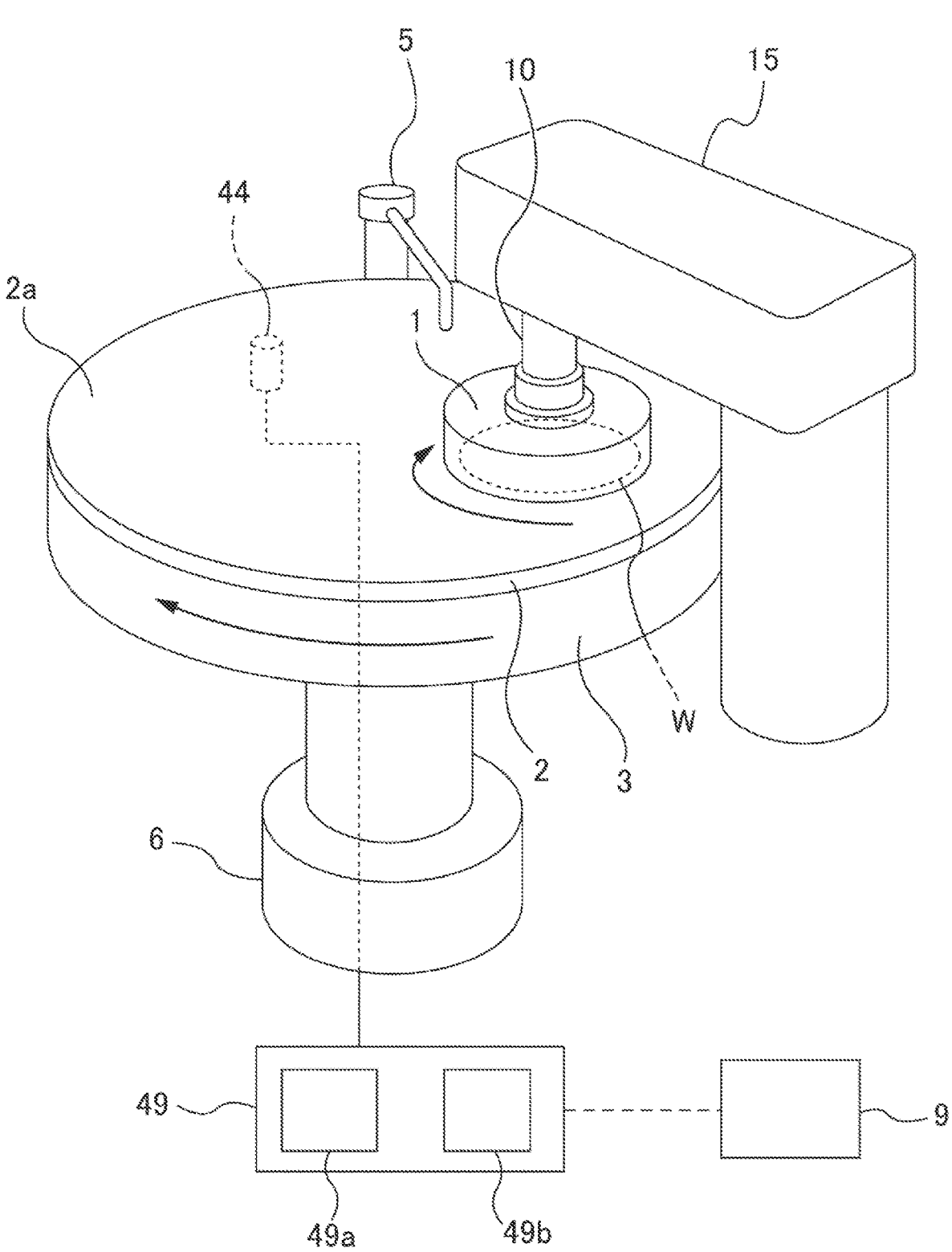
FIG. 1 is schematic view showing a polishing apparatus according to one embodiment.

FIG. 1 is schematic view showing a polishing apparatus according to one embodiment. As shown in FIG. 1, the polishing apparatus includes a polishing table 3 for supporting a polishing pad 2, a polishing head (substrate holder) 1 for holding and pressing a wafer W, which is an example of a substrate, against the polishing pad 2, a table motor 6 for rotating the polishing table 3, a polishing-liquid supply nozzle 5 for supplying polishing liquid, such as slurry, onto the polishing pad 2, and controller 9 for controlling operations of the polishing apparatus. The polishing pad 2 has an upper surface which provides a polishing surface 2a for polishing the wafer.

The polishing head 1 is coupled to a head shaft 10, and the head shaft 10 is coupled to a polishing-head motor, which is not shown in the drawing, through a coupling means, such as a belt. The polishing-head motor causes the polishing head 1 to rotate with the head shaft 10 in a direction indicated by an arrow. The polishing table 3 is coupled to the table motor 6, and the table motor 6 is configured to rotate the polishing table 3 and the polishing pad 2 in a direction indicated by an arrow. The directions of rotation of the polishing head 1 and the polishing table 3 are not limited to this embodiment. In one embodiment, the polishing head 1 and polishing table 3 may be configured to rotate in directions opposite to the directions indicated by the arrows in FIG. 1.

Polishing of the wafer W is performed as follows. The polishing-liquid supply nozzle 5 supplies the polishing liquid onto the polishing surface 2a of the polishing pad 2 on the polishing table 3, while the polishing table 3 and the polishing head 1 are rotated in the directions indicated by the arrows in FIG. 1. While the wafer W is being rotated by the polishing head 1, the wafer W is pressed against the polishing surface 2a of the polishing pad 2 in the presence of the polishing liquid on the polishing pad 2. The surface of the wafer W is polished by a chemical action of the polishing liquid, and a mechanical action of abrasive grains contained in the polishing liquid or the polishing pad 2.

The polishing apparatus shown in FIG. 1 has an acoustic sensor 44 for detecting a polishing state of the wafer W. This type of acoustic sensor 44 is, for example, an ultrasonic sensor, or an AE (Acoustic Emission) sensor. The acoustic sensor 44 is disposed in a polishing chamber in which the polishing head 1, and the polishing table 3 described above are placed, and collects polishing sounds generated when the wafer W is being polished.

The acoustic sensor 44 is coupled to the controller 9 through a sound processing device 49. The sound processing device 49 has an amplifier 49a for amplifying sound signals collected by the acoustic sensor 44, and a filter 49b for removing noise from the sound signals amplified by the amplifier 49a. The controller 9 is configured to be able to receive the sound signals collected by the acoustic sensor 44 and processed by the sound processing device 49. Further, the controller 9 is configured to determine, based on the polishing sounds of the wafer W generated during polishing of the wafer W, the polishing state, such as an end point of the wafer W and/or a polishing abnormality. A calibration method for this acoustic sensor 44 is described below.

In a calibrating for the acoustic sensor 44, the controller 9 first acquires the polishing sounds of the wafer W using the acoustic sensor 44, and selects at least two distinctive sounds, having distinctive frequencies respectively, from the acquired polishing sounds. In this specification, the distinctive sound means a sound of a frequency having a distinctive peak among the polishing sounds acquired by the acoustic sensor 44. In acquiring the polishing sound of the wafer W, the controller 9 accumulates, for example, the output values of the acoustic sensor 44 for a predetermined period of time, and averages the output values for each frequency, of the acoustic sensor 44 to thereby determine the polishing sounds of the wafer W.

Figure 2:
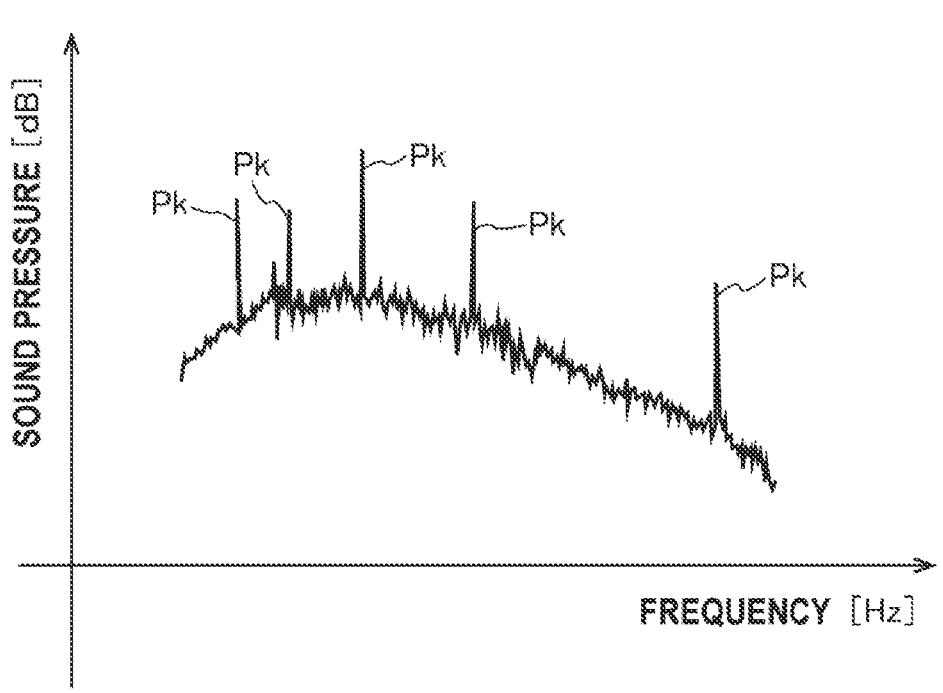
FIG. 2 is a graph showing an example of polishing sounds acquired by the acoustic sensor.

FIG. 2 is a graph showing an example of polishing sounds acquired by the acoustic sensor. In FIG. 2, a vertical axis represents sound pressure, and a horizontal axis represents frequency. As shown in FIG. 2, the polishing sounds acquired by the acoustic sensor 44 have a plurality of distinctive peaks Pk. The controller selects at least two peaks Pk among these peaks Pk, and then determines sounds of frequencies corresponding to the selected peaks as the distinctive sounds, respectively. Further, the controller 9 stores the frequencies of the distinctive sounds and the sound pressures corresponding to these frequencies.

Next, a sound source is coupled to any of the polishing table 3, the acoustic sensor 44, and the polishing head 1. Further, at least two distinctive sounds mentioned above are output from this sound source, and then the at least two distinctive sounds are collected (input) to the acoustic sensor 44. The controller 9 acquires the output values of the acoustic sensor 44 that have been input with the distinctive sounds, and calibrates the output values of the acoustic sensor such that all of these output values c within a predetermined allowable range. The controller 9 stores the predetermined allowable range in advance.

Figure 3:
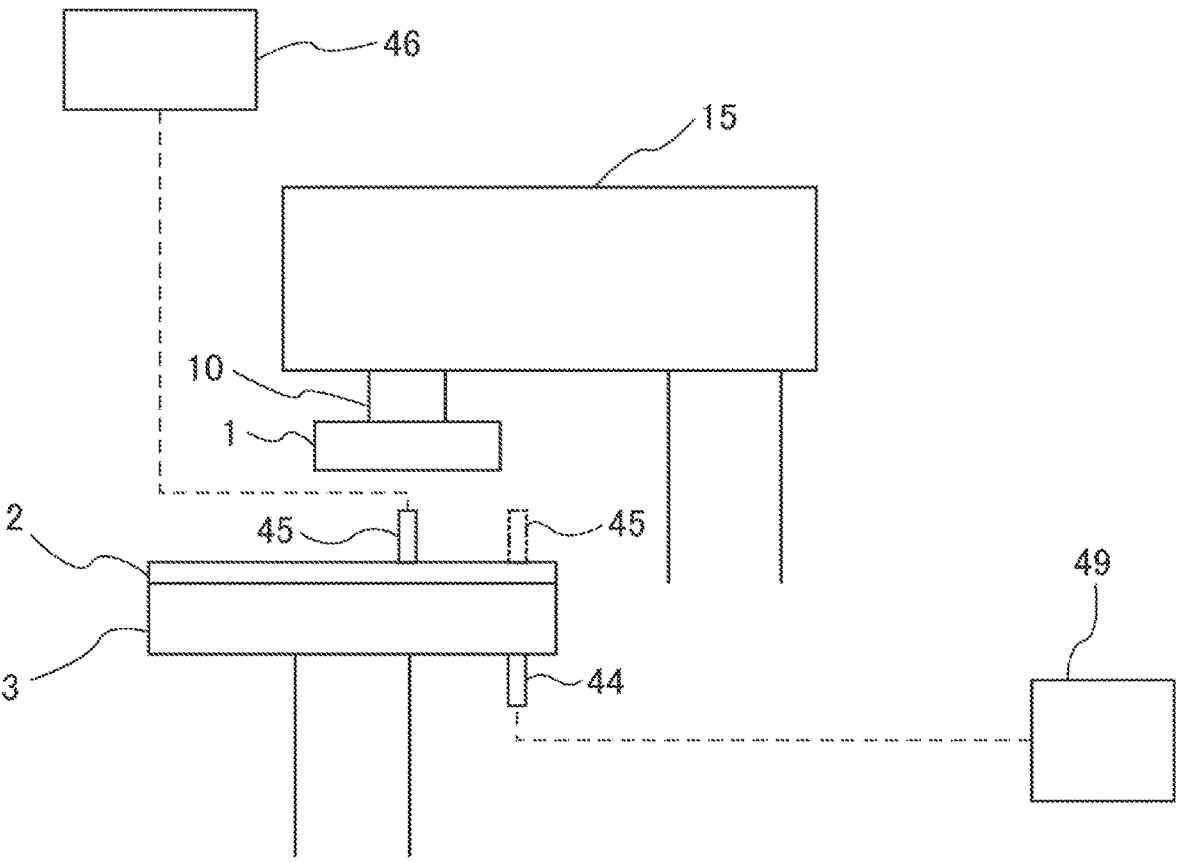
FIG. 3 is a schematic view illustrating a calibration method for the acoustic sensor according to one embodiment.

FIG. 3 is a schematic view illustrating a calibration method for the acoustic sensor according to one embodiment. The acoustic sensor 44 shown in FIG. 3 is an AE sensor attached to a lower surface of the polishing table 3. In this embodiment, the acoustic sensor 44 collects, during polishing of the wafer W, the polishing sounds of the wafer W while rotating together with the polishing table 3. In one embodiment, the acoustic sensor 44 may be imbedded in the polishing table 3.

As shown in FIG. 3, when calibrating the acoustic sensor 44, which is the AE sensor, attached to the lower surface of the polishing table 3 (or imbedded in the polishing table 3), the sound source 45 is placed to the polishing surface 2a of the polishing pad 2 supported by the polishing table 3. With this operation, the sound source 45 is coupled to the polishing table 3 through the polishing pad 2.

In one embodiment, after the polishing pad 2 is removed, the sound source 45 may be coupled directly to an upper surface of the polishing table 3. The polishing pad 2 is an expendable item, and is an item that is periodically maintained or replaced. Performing calibration process for the acoustic sensor 44 during the maintenance or replacement of the polishing pad 2 enables downtime of the polishing apparatus to be reduced.

A position for coupling the sound source 45 to the polishing table 3 is freely selectable. For example, a holder (not shown) for holding the sound source 45 may be secured to a side surface or an under surface of the polishing table 3 to hold the sound source 45, or the sound source 45 may be directly attached to the side surface or the under surface of the polishing table 3.

A signal generator 46 for outputting the distinctive sounds from the sound source 45 is coupled to the sound source 45, and the signal generator 46 is coupled to the controller 9. As described above, the controller 9 causes the signals corresponding to the acquired distinctive sounds to be input from the signal generator 46 to the sound source 45, thereby causing the distinctive sounds to be output from the sound source 45 at the acquired sound pressure. Examples of the signal input from signal generator 46 to the sound source 45 include SIN wave, rectangular wave, and BURST wave.

The acoustic sensor 44 collects the distinctive sounds output from the sound source 45. In other words, the distinctive sounds output from the sound source 45 are input to the acoustic sensor 44, and the output values (sound pressures) of the acoustic sensor 44 relative to the distinctive sounds are input to the controller 9. An allowable range for the output values of acoustic sensor 44 is input to the controller 9 in advance, and the controller 9 compares all of the output values from the acoustic sensor 44, in which the distinctive sounds have been input, with the allowable range. When no output value deviates from the allowable range, the controller 9 causes the calibration process of the acoustic sensor 44 to be completed.

If there is even one output value that deviates from the allowable range, the controller 9 calculates a conversion formula for correction relative to the output values of the acoustic sensor 44 so as to bring all output values within the allowable range. The conversion formula for correction is represented as, for example, an approximate straight line determined by the least-squares method based on the output values (sound pressures) of the acoustic sensor 44 with respect to the frequencies of the distinctive sounds. The controller 9 changes a slope and an offset value of the conversion formula for correction, which are represented as an approximate straight line, such that all of the output values of the acoustic sensor 44 come within the allowable range. The offset value corresponds to a y-intercept when the approximate straight line is drawn on a graph with a vertical axis (y-axis) as the output value of the acoustic sensor 44 and a horizontal axis (x-axis) as the frequency.

When the controller 9 selects two distinctive sounds, the conversion formula for correction is represented by a straight line passing through the output values of the two distinctive sounds. In this case, the controller 9 changes the slope and the offset value of the conversion formula for correction such that the two output values of the acoustic sensor 44 match the sound pressures of the distinctive sounds.

According to such calibration process, the acoustic sensor 44 is calibrated based on the polishing sounds generated during polishing of the wafer W. As a result, the acoustic sensor 44 can be accurately calibrated based on the actual polishing sounds.

The controller 9 may store in advance an upper threshold and a lower threshold set in a wider range than the allowable range described above. In this case, the controller 9 is configured to issue an alarm if any one of the output values of the acoustic sensor 44 exceeds the upper threshold or the lower threshold. This alarm enables an operator to recognize a faulty installation or a failure of the acoustic sensor 44 and/or the sound source 45 as soon as possible.

In one embodiment, after the calibration process is completed, the controller 9 may be configured to perform a check operation. The check operation is a process for checking whether or not the acoustic sensor 44 has been calibrated reliably. Specifically, the sound source 45 outputs the distinctive sounds again, and the acoustic sensor 44 outputs the output values in response to these distinctive sounds. The controller 9 inputs the output values from the acoustic sensor 44 into the calibrated conversion formula to acquire the output values of the acoustic sensor 44 after the calibration. Further, the controller 9 checks whether or not the output values of the calibrated acoustic sensor 44 are within the allowable range. When there is distinctive sound that deviates from the allowable range, the controller 9 may issue an alarm.

In the calibration process of the acoustic sensor 44, the sound source 45 is used to simulate the polishing sounds. For this purpose, in this embodiment, the sound source 45 is preferably an AE sensor that has the same configuration as the acoustic sensor 44. This configuration enables the distinctive sounds output by the sound source 45 to more accurately simulate the distinctive sounds collected by the acoustic sensor 44.

Further, it is preferable to place the sound source 45 at a position corresponding to the actual polishing position of the wafer W. Specifically, it is preferable to place the sound source 45 on the polishing pad 2 or polishing table 3 and directly under the center of the polishing head 1.

Placing the sound source 45 as close as possible to the acoustic sensor 44 can prevent the acoustic sensor 44 from collecting unwanted noise during the calibration process. Accordingly, the sound source 45 may be placed on a polishing pad 2 or polishing table 3 and at a position corresponding directly above the acoustic sensor 44 (see the two dotted lines in FIG. 3).

Figure 4:
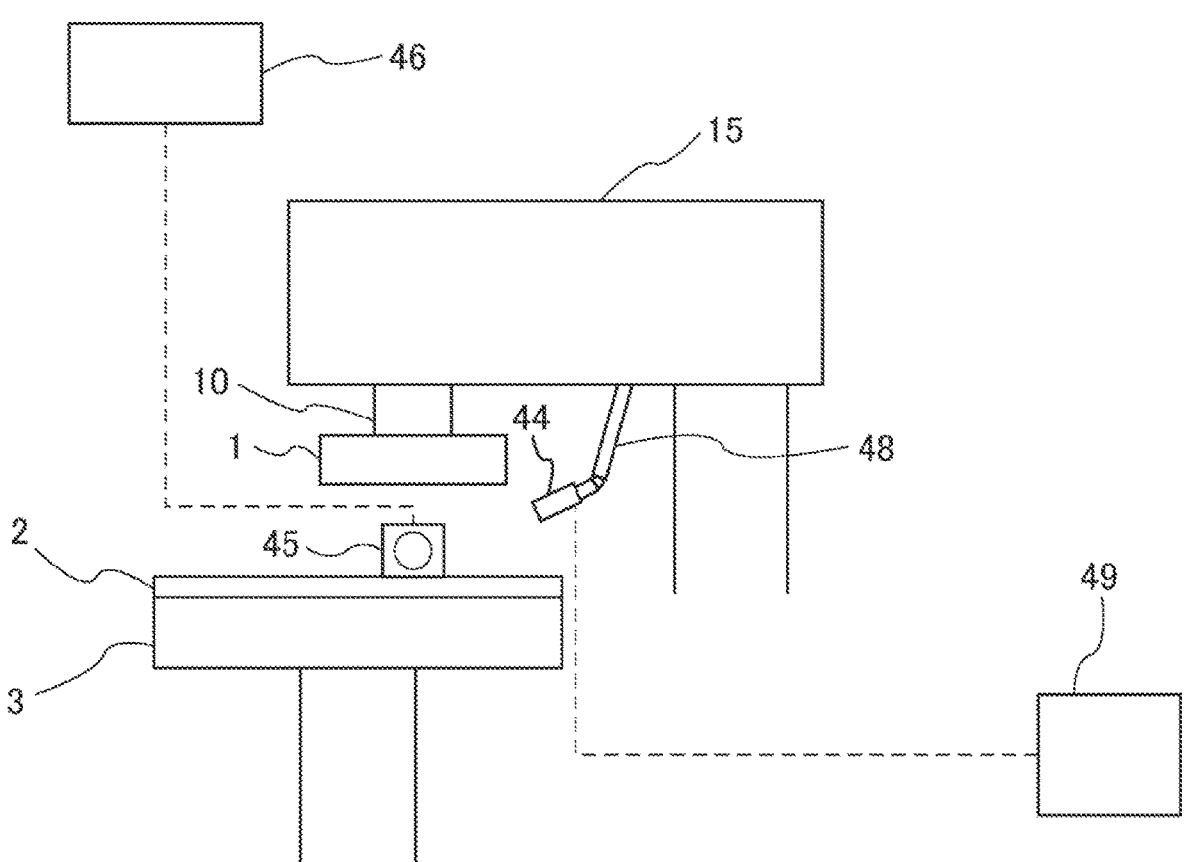
FIG. 4 is a schematic view illustrating the calibration method for the acoustic sensor according to another embodiment.

FIG. 4 is a schematic view illustrating the calibration method for the acoustic sensor according to another embodiment. Configuration of this embodiment, which is not specifically described, is the same as the configuration of the above-described embodiments, and thus duplicate descriptions thereof are omitted.

The acoustic sensor 44 is preferably arranged in the vicinity of a polishing position of the wafer W in order to collect accurate polishing sounds. In the embodiment shown in FIG. 4, the acoustic sensor 44 is coupled to a head arm 15 for supporting the head shaft 10 to which the polishing head 1 is coupled. Specifically, the acoustic sensor 44 is mounted to a tip of a sensor arm 48 extending from the head arm 15. This configuration enables the acoustic sensor 44 to be placed in the vicinity of the polishing position of the wafer W, and further, enables a distance between the acoustic sensor 44 and the polishing position of the wafer W to be kept at a constant distance. W. Further, mounting the acoustic sensor 44 to the sensor arm 48 coupled to the head arm 15 achieves space savings and prevents the acoustic sensor 44 from interfering with operators during maintenance of the polishing pad 2 and the like.

Such acoustic sensor 44 is, for example, an ultrasonic sensor. A calibration process for the acoustic sensor 44, which is the ultrasonic sensor, is also similar to the calibration process for the acoustic sensor 44, which is an AE sensor, as described above. More specifically, the controller 9 first acquires the polishing sounds of the wafer W using the acoustic sensor 44, which is the ultrasonic sensor, and selects at least two distinctive sounds from the acquired polishing sounds. Next, the sound source 45 is coupled to the polishing table 3. The sound source 45 may be coupled to the polishing table 3 through the polishing pad 2 or directly to the polishing table 3.

Further, at least two distinctive sounds are output from this sound source 45, and at least two distinctive sounds are collected (input) to the acoustic sensor 44. The controller 9 acquires the output value of the acoustic sensor 44 to which the distinctive sounds have been input, and calibrates the output values of the acoustic sensor 44, such that all of these output values come within the predetermined allowable range. When calibrating the output values of the acoustic sensor 44, the controller 9 calculates a conversion formula for correction relative to the output values of the acoustic sensor 44, and changes a slope and an offset of the conversion formula for correction.

In this embodiment also, it is preferable to place the sound source 45 at a position corresponding to the actual polishing position of the wafer W. Specifically, it is preferable to place the sound source 45 on the polishing pad 2 or polishing table 3 and directly under the center of the polishing head 1.

Figure 5:
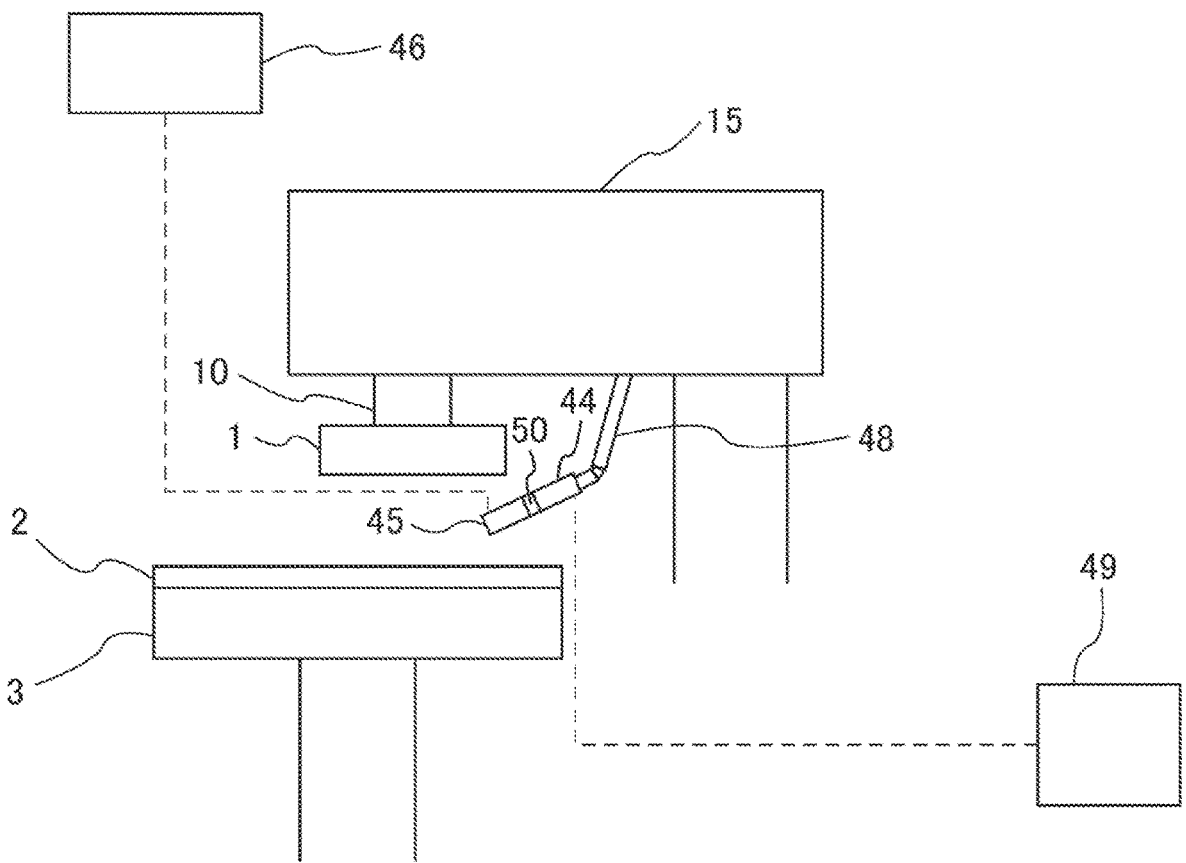
FIG. 5 is a schematic view illustrating the calibration method for the acoustic sensor according to still another embodiment.

FIG. 5 is a schematic view illustrating the calibration method for the acoustic sensor according to still another embodiment. Configuration of this embodiment, which is not specifically described, is the same as the configuration of the above-described embodiments, and thus duplicate descriptions thereof are omitted. The embodiment shown in FIG. 5 corresponds to a variation of the embodiment shown in FIG. 4.

In the embodiment shown in FIG. 5, the sound source 45 is the AE sensor, which is coupled to the acoustic sensor 44 through a bracket 50. In this case, it is not necessary to remove the sound source 45 from the acoustic sensor 44 even during polishing of the wafer W. Therefore, the calibration process of the acoustic sensor 44 can be performed under a situation that is almost identical to the actual polishing situation of the wafer W.

Figure 6:
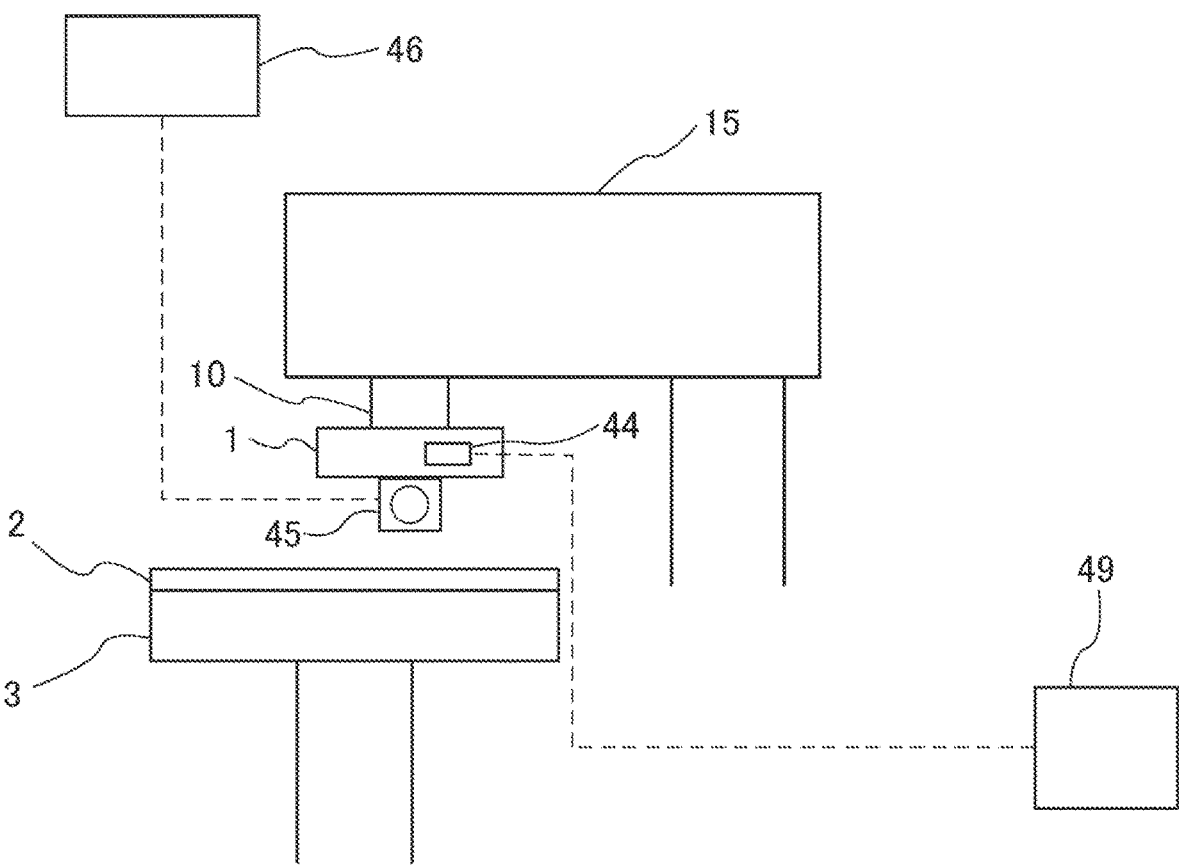
FIG. 6 is a schematic view illustrating the calibration method for the acoustic sensor according to still another embodiment.

FIG. 6 is a schematic view illustrating the calibration method for the acoustic sensor according to still another embodiment. Configuration of this embodiment, which is not specifically described, is the same as the configuration of the above-described embodiments, and thus duplicate descriptions thereof are omitted In the embodiment shown in FIG. 6, the acoustic sensor 44 is attached to the polishing head 1. FIG. 6 illustrates an example in which the acoustic sensor 44 is attached to an outer surface of the polishing head 1. In one embodiment, the acoustic sensor 44 may be imbedded into the polishing head 1. The acoustic sensor 44 may be, for example, an ultrasonic sensor or an AE sensor.

When performing the calibration process of the acoustic sensor 44 attached to the polishing head 1, the sound source 45 is attached to the polishing head 1. In the illustrated embodiment, the sound source 45 is attached to a lower surface of the polishing head 1. In one embodiment, the sound source 45 may be attached to a side surface or an upper surface of the polishing head 1. The sound source 45 may be an AE sensor.

In this case also, the controller 9 first acquires the polishing sounds of the wafer W using the acoustic sensor 44 attached to the polishing head 1, and selects at least two distinctive sounds from the acquired polishing sounds. Next, the sound source 45 is coupled to the polishing head 1. Further, at least two distinctive sounds are output from this sound source 45, and at least two distinctive sounds are collected (input) to the acoustic sensor 44. The controller 9 acquires the output value of the acoustic sensor 44 to which the distinctive sounds have been input, and calibrates the output values of the acoustic sensor 44, such that all of these output values come within the predetermined allowable range. When calibrating the output values of the acoustic sensor 44, the controller 9 calculates a conversion formula for correction relative to the output values of the acoustic sensor 44, and changes a slope and an offset of the conversion formula for correction.

Even with this configuration, the calibration process of the acoustic sensor 44 can be performed under a situation that is almost identical to the actual polishing situation of the wafer W. During the calibration process of the acoustic sensor 44, the polishing head 1 preferably hold the wafer W in order to more accurately simulate the actual polishing situation of the wafer W.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. A calibration method for an acoustic sensor provided in a polishing apparatus in which a substrate held in a substrate holder is pressed against a polishing pad attached to a polishing table to thereby polish the substrate, comprising:

acquiring polishing sounds of the substrate using the acoustic sensor;

selecting at least two distinctive sounds, having distinctive frequencies respectively, from the acquired polishing sounds;

outputting the at least two distinctive sounds from a sound source coupled to any of the polishing table, the acoustic sensor, and the substrate holder to cause the at least two distinctive sounds to be input to the acoustic sensor; and calibrating output values of the acoustic sensor, such that the output values of the acoustic sensor relative to the at least two distinctive sounds come within an allowable range, wherein the at least two distinctive sounds are a sound of a frequency having a distinctive peak among the polishing sounds acquired by the acoustic sensor.

2. The calibration method according to claim 1, wherein the acoustic sensor is an AE sensor mounted to the polishing table, and the sound source is placed at a position corresponding to a polishing position of the substrate in the polishing pad or the polishing table.

3. The calibration method according to claim 2, wherein the sound source is an AE sensor for sound source, which has the same configuration as the AE sensor.

4. The calibration method according to claim 2, wherein the sound source is arranged directly above the AE sensor.

5. The calibration method according to claim 1, wherein the acoustic sensor is an ultrasonic sensor coupled to an arm supporting the substrate holder, and the sound source is placed at a position corresponding to a polishing position of the substrate in the polishing pad or the polishing table.

6. The calibration method according to claim 1, wherein the acoustic sensor is an ultrasonic sensor coupled to an arm supporting the substrate holder, and the sound source is coupled to the acoustic sensor.

7. The calibration method according to claim 1, wherein the acoustic sensor is mounted to the substrate holder, and the sound source is mounted to the substrate holder.

8. The calibration method according to claim 7, wherein the acoustic sensor is an AE sensor.

9. The calibration method according to claim 8, wherein the sound source is an AE sensor for sound source, which has the same configuration as the AE sensor.

10. The calibration method according to claim 1, wherein an alarm is issued when any of output values of the acoustic sensor relative to the at least two distinctive sounds exceed an upper threshold or a lower threshold.

* * * * *